US010856554B2

(12) United States Patent
Jackson

(10) Patent No.: US 10,856,554 B2
(45) Date of Patent: Dec. 8, 2020

(54) FOOD CUTTING TOOL

(71) Applicant: Darlene Jackson, Tallahassee, FL (US)

(72) Inventor: Darlene Jackson, Tallahassee, FL (US)

( * ) Notice: Subject to any disclaimer, the term of this patent is extended or adjusted under 35 U.S.C. 154(b) by 0 days.

(21) Appl. No.: 16/394,542

(22) Filed: Apr. 25, 2019

(65) Prior Publication Data
US 2019/0246650 A1     Aug. 15, 2019

Related U.S. Application Data

(60) Provisional application No. 62/749,389, filed on Oct. 23, 2018.

(51) Int. Cl.
| A21C 15/04 | (2006.01) |
| B26D 1/553 | (2006.01) |
| B26D 3/24 | (2006.01) |
| B26D 1/00 | (2006.01) |

(52) U.S. Cl.
CPC ............. *A21C 15/04* (2013.01); *B26D 1/553* (2013.01); *B26D 3/245* (2013.01); *B26D 2001/008* (2013.01)

(58) Field of Classification Search
CPC ........ A21C 15/04; B26D 1/553; B26D 3/245; B26D 2001/008
USPC ..................................... 30/114–117; D7/673
See application file for complete search history.

(56) References Cited

U.S. PATENT DOCUMENTS

| 653,991 | A | * | 7/1900 | Ferry | B23D 35/005 |
| | | | | | 30/117 |
| 817,027 | A | * | 4/1906 | Widdicombe | B26B 27/002 |
| | | | | | 30/117 |
| 872,422 | A | * | 12/1907 | Hodell | B26D 1/547 |
| | | | | | 83/651.1 |
| 1,111,373 | A | * | 9/1914 | Givulinovich | B26D 1/30 |
| | | | | | 30/117 |
| 1,331,786 | A | * | 2/1920 | Ruttle | B26B 27/002 |
| | | | | | 30/117 |
| 1,405,671 | A | * | 2/1922 | Crozier | B28B 11/161 |
| | | | | | 30/117 |
| 1,565,846 | A | * | 12/1925 | Cantey | A01J 21/02 |
| | | | | | 30/117 |
| 1,598,404 | A | * | 8/1926 | Tally | B26B 27/002 |
| | | | | | 30/117 |

(Continued)

FOREIGN PATENT DOCUMENTS

| GB | 230222 | A | * | 3/1925 | ............. B26D 1/553 |
| GB | 683421 | A | * | 11/1952 | ............. B26D 1/553 |

*Primary Examiner* — Jason Daniel Prone
(74) *Attorney, Agent, or Firm* — Boudwin Intellectual Property; Daniel Boudwin

(57) ABSTRACT

A food cutting tool. The food cutting tool has a body with an outer perimeter wall and an inner perimeter wall. The inner perimeter wall defines an open central area with a channel opening towards the open central area. The channel is sized to receive a plurality of wires which are utilized to cut through a piece of food. The plurality of wires is disposed diametrically across the open central area and each end of a wire is affixed in the channel of the inner perimeter wall. The plurality of wires is adjustably secured to the inner perimeter wall thereby enabling a user to selectively adjust the spacing between individual wires. In operation, the user places the food cutting tool over a piece of food and press down on the body, forcing the plurality of wires through the piece of food to divide the food into even portions.

6 Claims, 3 Drawing Sheets

(56) References Cited

U.S. PATENT DOCUMENTS

| | | | | |
|---|---|---|---|---|
| 2,023,706 A | * | 12/1935 | Smith | B26B 27/002 30/117 |
| 2,111,035 A | * | 3/1938 | Winslow | A01J 23/00 30/117 |
| 2,114,277 A | * | 4/1938 | Bloomfield | B26D 1/553 30/117 |
| 2,152,198 A | * | 3/1939 | Lowenfels | B26B 27/00 30/117 |
| 2,274,193 A | * | 2/1942 | Evans | B26B 27/002 30/117 |
| 2,403,190 A | | 7/1946 | Parraga | |
| 2,450,502 A | * | 10/1948 | Culdice | C14B 1/02 30/116 |
| 2,550,166 A | * | 4/1951 | Sargent et al. | B26B 27/002 30/117 |
| 2,557,539 A | | 6/1951 | Josephine | |
| 2,589,911 A | * | 3/1952 | Weinberg | B26B 27/002 30/117 |
| 2,707,504 A | * | 5/1955 | Hill | B26D 3/24 30/114 |
| 3,096,582 A | * | 7/1963 | Mueller | A01J 25/06 D7/673 |
| 3,109,470 A | * | 11/1963 | Urschel et al. | B26D 3/24 30/114 |
| 4,195,402 A | * | 4/1980 | Leffer | B26D 1/547 30/114 |
| 4,646,602 A | * | 3/1987 | Bleick | B26D 1/553 30/117 |
| 4,998,348 A | * | 3/1991 | Foate | A21C 15/04 30/114 |
| 5,153,993 A | * | 10/1992 | Whisnant | B26D 1/52 30/116 |
| 6,009,786 A | | 1/2000 | Hjelden | |
| 6,647,848 B1 | * | 11/2003 | Bruner | B26D 1/553 30/117 |
| D551,917 S | * | 10/2007 | Campbell | D7/673 |
| 8,146,468 B1 | * | 4/2012 | Kachelries | B26D 1/553 30/117 |
| 8,863,391 B2 | * | 10/2014 | Bagley | B26D 3/245 30/114 |
| D718,096 S | * | 11/2014 | Smith | D7/673 |
| 9,884,398 B2 | * | 2/2018 | Choi | B23C 3/00 |
| 2004/0025651 A1 | * | 2/2004 | Bachman | A21C 15/04 30/114 |
| 2008/0216628 A1 | * | 9/2008 | Hamilton | A21C 15/04 83/581.1 |
| 2010/0043239 A1 | | 2/2010 | Pittman | |
| 2011/0030222 A1 | | 2/2011 | Chen et al. | |
| 2014/0290069 A1 | * | 10/2014 | White, III | A21C 15/04 30/114 |
| 2015/0000141 A1 | | 1/2015 | Owens | |

* cited by examiner

FOOD CUTTING TOOL

CROSS REFERENCE TO RELATED APPLICATIONS

This application claims the benefit of U.S. Provisional Application No. 62/749,389 filed on Oct. 23, 2018. The above identified patent application is herein incorporated by reference in its entirety to provide continuity of disclosure.

BACKGROUND OF THE INVENTION

The present invention relates to kitchen utensils. More particularly, the present invention provides a food cutting tool that can be adjusted to cut a piece of food, such as a cake, into multiple slices in a variety of different sizes and shapes.

Many people enjoy cooking and baking food for multiple people. Baking cakes for parties is especially gratifying when the baker sees their hard work being enjoyed by so many individuals. However, it can be frustrating, inconvenient, and time consuming to cut these food items, such as a large cake, into portions for everyone. Often, individuals inadvertently cut cakes into uneven pieces and make a mess of the cake in the process. Individuals unskilled with a knife may injure themselves or ruin the cake. Additionally, individual slices of cake may fall over before the slices are served, and the resulting imbalance could topple the cake. Some people become nervous when cutting a cake because they do not want to ruin the cake with imperfect portions and slices.

Devices have been disclosed in the known art that relate to kitchen utensils, and more specifically cutting tools. These include devices that have been patented and disclosed in patent application publications. However, the devices in the known art have several drawbacks. For example, some cutting tools such as specialized knives can be dangerous in the hands of an unskilled, or young, user. Other devices may allow a user to cut individual slices at a time. Such devices are time consuming to use as the user must stand in one place and repeatedly cut individual slices. Other devices slice all of the pieces in one specific size, which does not allow the user to customize the sizes of pieces of food to be served. Still other devices require a cleaning between uses, or clean cuts will not be made.

Therefore, a food cutting tool that can be adjusted to cut a piece of food, such as a cake, into multiple slices in a variety of different sizes and shapes, is desired. The present invention substantially diverges in design elements from the known art and consequently it is clear that there is a need in the art for an improvement to existing kitchen utensils. In this regard the present invention substantially fulfills these needs.

SUMMARY OF THE INVENTION

In view of the foregoing disadvantages inherent in the known types of kitchen utensils now present in the prior art, the present invention provides a food cutting tool wherein the same can be utilized to cut a piece of food, such as a cake, into multiple slices in a variety of different sizes and shapes. The present food cutting tool comprises an body with an outer perimeter wall and an inner perimeter wall. The inner perimeter wall defines an open central area with a channel opening towards the open central area. The channel is sized to receive a plurality of wires which are utilized to cut through a piece of food. The plurality of wires is disposed diametrically across the open central area and each end of a wire is affixed in the channel of the inner perimeter wall. The plurality of wires is adjustably secured to the inner perimeter wall thereby enabling a user to selectively adjust the spacing between individual wires. In operation, the user places the food cutting tool over a piece of food and press down on the body, forcing the plurality of wires through the piece of food to divide the food into even portions.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
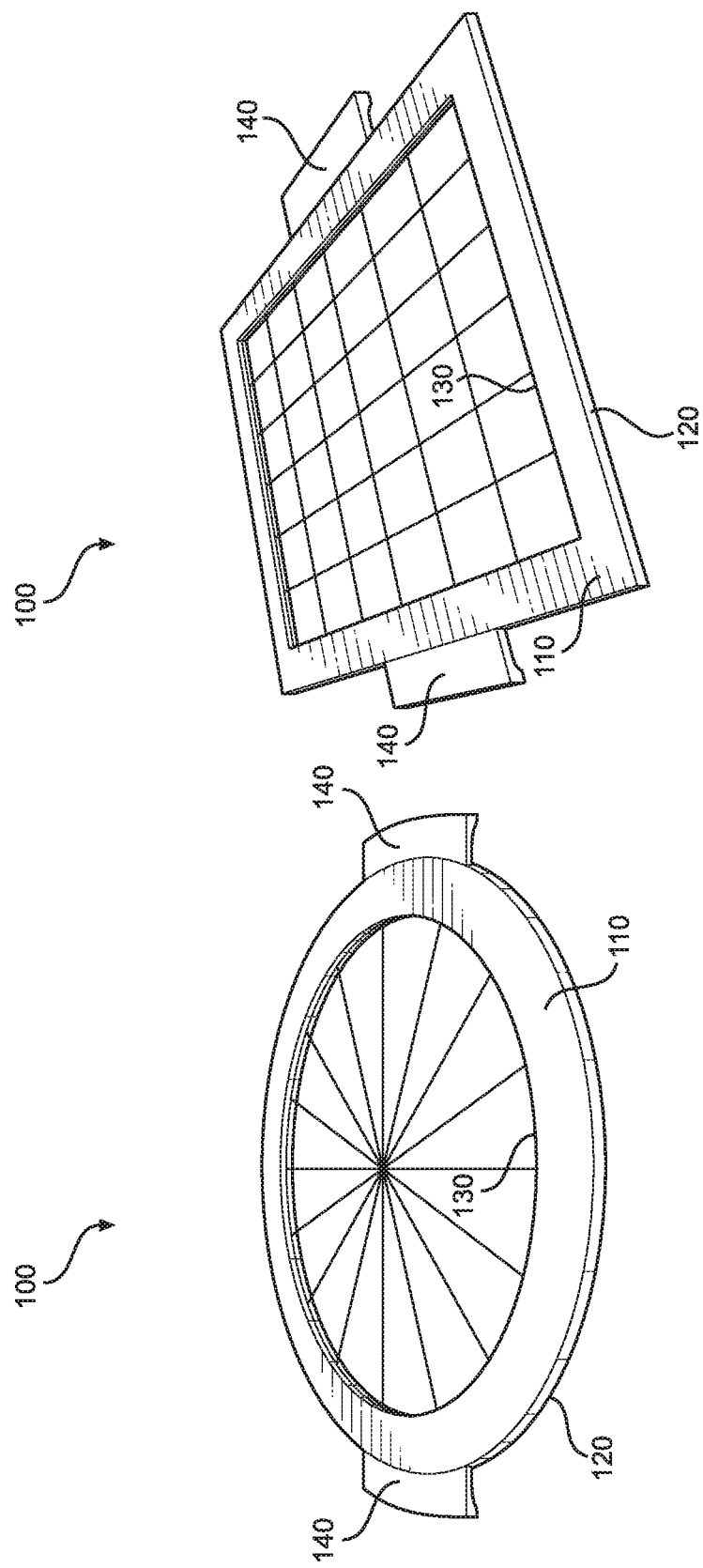
FIG. 1A shows a perspective view of an embodiment of the food cutting tool, wherein the body is circular.
FIG. 1B shows a perspective view of an embodiment of the food cutting tool, wherein the body is rectangular.

Reference is made herein to the attached drawings. Like reference numerals are used throughout the drawings to depict like or similar elements of the food cutting tool. For the purposes of presenting a brief and clear description of the present invention, a preferred embodiment will be discussed as used for the food cutting tool. The figures are intended for representative purposes only and should not be considered to be limiting in any respect.

Referring now to FIGS. 1A and 1B, there are shown perspective views of embodiments of the food cutting tool, wherein the body is circular in one embodiment and rectangular in another embodiment. The food cutting tool 100 has a body 110 with an outer perimeter wall 120 and an inner perimeter wall 130. In various embodiments, the body 110 is comprised of wood, steel, or plastic, or a combination thereof. Such a variety of materials provide the benefits of differing strengths, durability, and aesthetics. In the embodiment shown in FIG. 1A the body 110 is circular, while in the embodiment shown in FIG. 1B the body 110 is rectangular. Such a variety of body shapes enable a user to easily surround and cut circular and rectangular food items such as rectangular and circular cakes. In various embodiments, the body 110 is sized and configured to fit around various sizes and shapes of food that is desired to be cut. In the shown embodiment, a pair of handles 140 are disposed on an exterior of the outer perimeter wall. As such, the handles 140 provide convenience to a user where the user is able to operate the food cutting tool 100 without contacting the targeted food item with his or her hand. In a further embodiment, the pair of handles 140 are ergonomic, thereby allowing a user to have a more stable grip while utilizing the food cutting tool 100.

Figure 2:
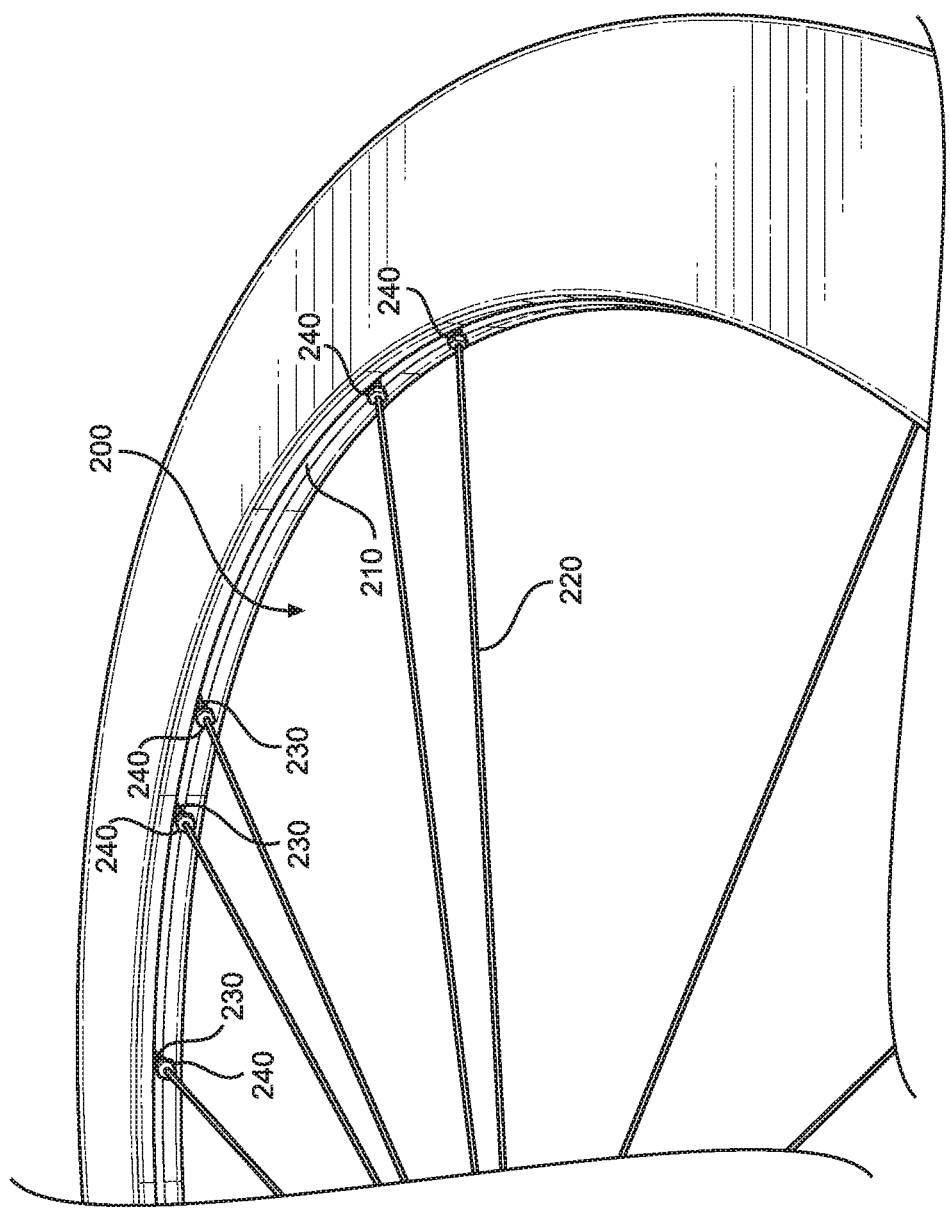
FIG. 2 shows a perspective view of an embodiment of the food cutting tool with a focus on the channel.

Referring now to FIG. 2, there is shown a perspective view of an embodiment of the food cutting tool with a focus on the channel. The inner perimeter wall 130 defines an open central area 200 of the food cutting tool. The inner perimeter wall 130 further comprises a channel 210, wherein the open end of the channel 210 opens towards the open central area 200. In one embodiment, the channel 210 is disposed entirely around the inner perimeter wall 130. The open end of the channel 210 is uniformly sized such that a plurality of wires 220 are able to freely slide along a length of the channel 210. The channel 210 is sized and configured to receive a plurality of wires 220, the plurality of wires 220 are utilized to cut through a piece of food. In various embodiments, the plurality of wires 220 is comprised of steel or plastic. Such materials provide strength and durability such that the plurality of wires 220 are not easily worn out and fray. The plurality of wires 220 are under tension and are configured to cut through a piece of food by application of friction. Utilization of a wire under tension to slice a piece of food allows for crisper cuts as food does not accumulate on the wire.

The plurality of wires 220 is disposed diametrically across the open central area 200. In one embodiment, each end of the plurality of wires 220 is affixed in the channel 210 of the inner perimeter wall 130. In a further embodiment, the plurality of wires 220 can be evenly spaced, such that by utilizing the food cutting tool, each slice of the piece of food is the same size and shape.

In another embodiment, the plurality of wires 220 can freely move within the channel 210. In such an embodiment, the distance between the plurality of wires 220 can be selectively adjusted thereby enabling a user to adjust the size of the slices of the piece of food that result from utilization of the plurality of wires 220 to cut through the piece of food. In one embodiment the plurality of wires 220 can further comprise a plurality of tension nuts 240, configured to lock the plurality of wires 220 into place in the channel 210 when tightened against the inner perimeter wall 130. In a further embodiment, a distal end of the plurality of wires 220 comprises a threading 230 on which the plurality of tension nuts 240 travel.

Figure 3:
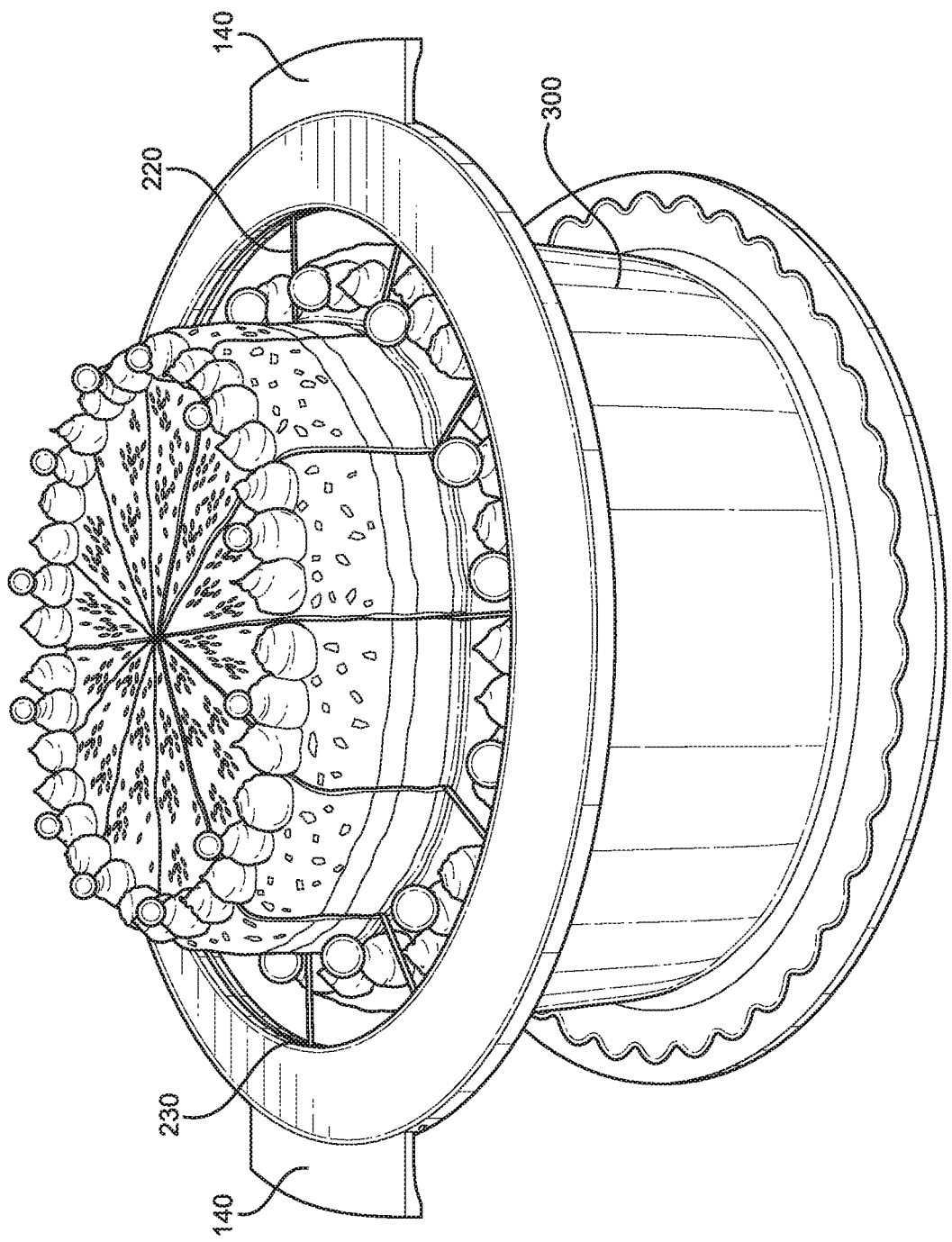
FIG. 3 shows a perspective view of an embodiment of the food cutting tool, in use.

Referring now to FIG. 3, there is shown a perspective view of an embodiment of the food cutting tool, in use. In operation, a user adjusts the spacing of the plurality of wires 220 to the desired shape and thickness of the resulting slices of food 300 that they desire to create. In various embodiments, the user locks the position of the plurality of wires 220 in place using tension nuts which travel along a threading 230. The user then holds the food cutting tool over the item of food 300 that the user desires to cut. The user pushes the food cutting tool down and through the piece of food, utilizing the plurality of wires 220 to slice through the food. In various embodiments, the user utilizes the handles 140 to provide greater stability and comfort while pushing the food cutting tool through the piece of food 300. In such a manner, a user can utilize the food cutting tool to cut multiple slices in a piece of food, such as a cake, at the same time, thereby providing even, uniform, and customizable sizes and shapes to the pieces of food produced via slicing.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A food cutting tool, comprising:
a plurality of wires and a body with an outer perimeter wall and an inner perimeter wall;
the inner perimeter wall defining an open central area;
the inner perimeter wall further comprising a channel;
the channel configured to receive a distal end of the plurality of wires;
the distal end of the plurality of wires slidably disposed in the channel;
the distal end of the plurality of wires further comprising a threading;
at least one tension nut complementarily disposed about the threading of the distal end of each of the plurality of wires;
wherein the tension nuts lock each of the plurality of wires into place in the channel by selectively compressing against the inner perimeter wall; and
the plurality of wires disposed diametrically across the open central area.

2. The food cutting tool of claim 1, wherein the body is composed of a material selected from the group consisting of: a wood material, a steel material, and a plastic material.

3. The food cutting tool of claim 1, wherein the plurality of wires is comprised of a material selected from the group consisting of: a steel material and a plastic material.

4. The food cutting tool of claim 1, further comprising at least one handle disposed on an exterior of the outer perimeter wall.

5. The food cutting tool of claim 1, wherein the body is circular.

6. The food cutting tool of claim 1, wherein the body is rectangular.

* * * * *